(No Model.)
C. A. THOMSON.
TOOL FOR STONE PLANERS.
No. 585,011.  Patented June 22, 1897.
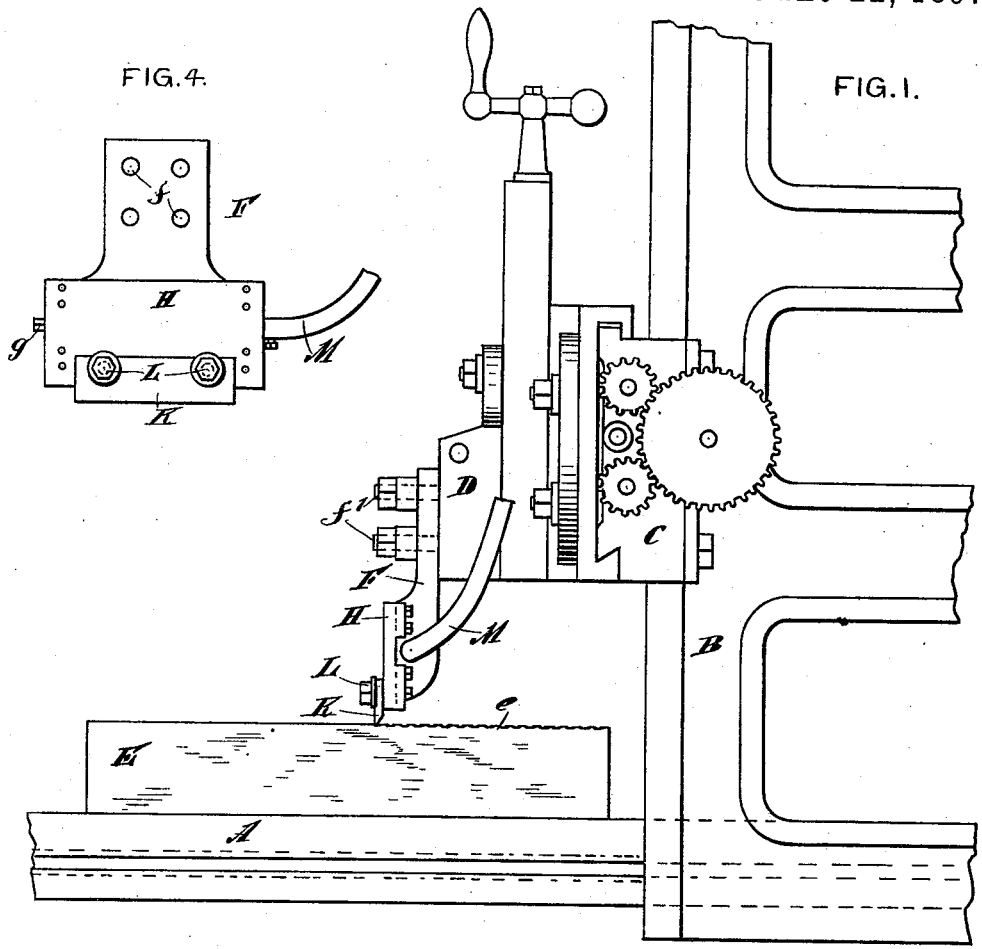
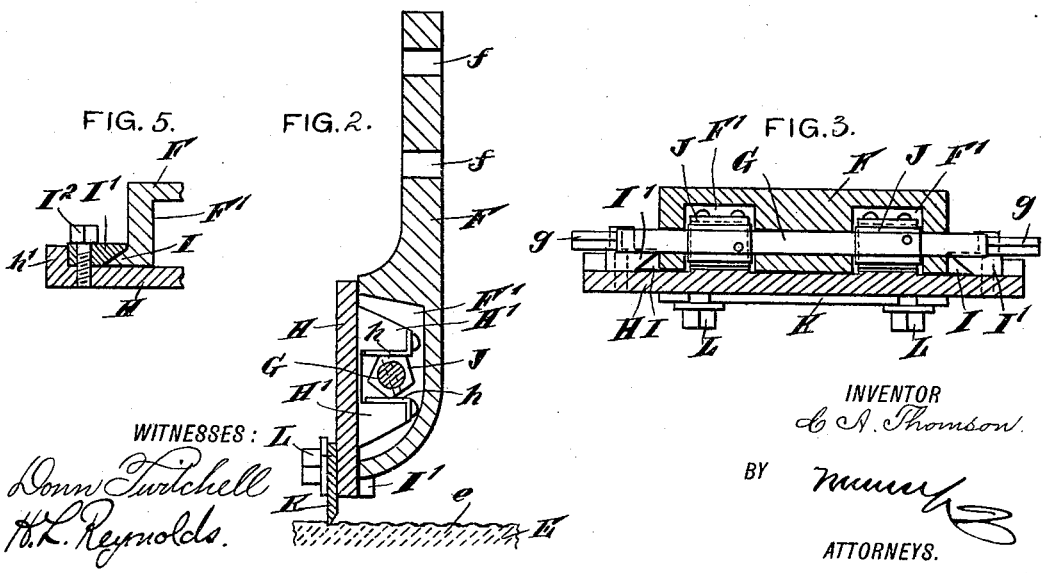
WITNESSES:
Donn Twitchell
H. L. Reynolds
INVENTOR
C. A. Thomson
BY
[signature]
ATTORNEYS.

UNITED STATES PATENT OFFICE.

CHARLES A. THOMSON, OF KEARNEY, NEW JERSEY.

TOOL FOR STONE-PLANERS.

SPECIFICATION forming part of Letters Patent No. 585,011, dated June 22, 1897.

Application filed November 16, 1896. Serial No. 612,261. (No model.)

*To all whom it may concern:*

Be it known that I, CHARLES A. THOMSON, of Kearney, in the county of Hudson and State of New Jersey, have invented a new and Improved Tool for Planing-Machines, of which the following is a full, clear, and exact description.

My invention relates to an improvement in tools for planing-machines, designed to be used in forming a corrugated or tooled surface at right angles to the travel of the machine.

The invention consists, essentially, in mechanism by which a slide carrying the cutting-tool may be made to reciprocate vertically while the stone is moved thereunder horizontally.

Reference is to be had to the accompanying drawings, forming a part of this specification, in which similar characters of reference indicate corresponding parts in all the views.

Figure 1 is a side elevation of a portion of a planer, showing the tool and cutter-heads. Fig. 2 is a vertical section through the tool. Fig. 3 is a horizontal section upon the axis of the shaft in the tool. Fig. 4 is a front elevation of the tool, and Fig. 5 is a detail section showing the manner of attaching the guide-blocks to the shank of the tool.

The object of my invention is to provide a tool which may be readily attached to ordinary planers for producing this "tooled" surface upon stones, also to keep the same in simple form and so that it may be built cheaply and applied to the planer without changing any part of the planer.

In the drawings, B represents the uprights of the planer, A the reciprocating bed, which travels beneath the tool, and E the block of stone being operated upon. C is the cross-bar of the planer, and D the ordinary head carrying the tools. These parts are the same as in any ordinary planer.

My improved tool consists of a shank or body F, provided with holes $f$ for bolting the same to the face of the head D. The lower portion of this shank or body F is provided with two recesses F', and also with a hole adapted to receive the shaft G. This shaft carries cams J, which, as shown in the drawings, are five-sided, and have a very slight lift. The outer ends of this shaft G are square, as shown at $g$, or otherwise shaped, so that a socket upon one end of a flexible shaft may be placed over the same to turn it. This flexible shaft is shown at M and may be attached at the other end to any convenient revolving shaft upon the machine.

The side edges of the shank or body F of the tool are formed with angular surfaces I, which form guides for the reciprocating member to slide upon. This reciprocating member consists of a plate H, provided with lugs H' upon one side, which embrace the cams J. These lugs are faced with hardened plates $h$, which are directly engaged by the cams. The outer side edges of the plate H are provided with small flanges $h'$, which serve as backing for the dovetail guide-blocks I'. These blocks are secured to the plate H by bolts or screws I². It is necessary to have these blocks detachable from the plate in order to remove the same from the shank, because the lugs H' are set within the recess F' in the shank or body.

To the front face of the plate H is bolted the cutting-tool K by means of bolts L. This cutting-tool may be made of any width necessary to cover the surface of the stone being operated upon. The motion of the plate H is positive in both directions, as the cam acts upon the lugs upon both sides. It is consequently necessary that the cam J should have an odd number of sides—that is, that the high point upon one side should be directly opposite the low point upon the opposite side.

I have not herein shown the connection of the flexible shaft M to the power. This may be accomplished in many different ways. The exact connection will in each case depend upon the circumstances of that case.

My device being made as an ordinary tool and attachable to the ordinary tool-head may be used for dressing the surfaces of stones at any angle within the limit of the tool-head. It may be attached to a tool-head adapted to work upon the side of the stone as well as to one working upon the top, and in planers provided with sufficient tool-heads the top and side surfaces may be dressed at the same time. It is immaterial which side of the machine the shaft M is connected to or which side of the tool is up, as the shaft G is provided for the attachment of the flexible shaft M at either end.

Having thus described my invention, I claim as new and desire to secure by Letters Patent—

1. In a tool for stone-cutting planers, the combination of a slide constrained to reciprocate in a straight line and carrying a cutting-tool, said slide having opposing surfaces adapted to be engaged by a cam to reciprocate it, with a shaft carrying a many-sided cam of an odd number of sides adapted to engage said surfaces, and means for rotating the shaft, substantially as described.

2. In a tool for stone-cutting planers, the combination of a shank having guideways thereon and adapted to be bolted to the planer-head, a shaft journaled therein, a cam of an odd number of sides fixed upon said shaft, means for rotating said shaft, with a tool-carrying slide movable upon the guideways and engaging the cam to be reciprocated thereby, substantially as described.

3. In a tool for stone-cutting planers, the combination of a shank or body having guides thereon, a shaft journaled therein and provided with a many-sided cam adapted to give the tool a number of reciprocations for each revolution of the shaft, with a slide movable on the guides and having lugs embracing the cam, means for clamping a cutting-blade thereto, and means for rotating said shaft, substantially as specified.

4. In a tool for stone-cutting planers, the combination of a shank adapted to be fixed to the planer-head and having a recess or pocket formed therein for the reception of the operating-cam and open only on one face, separate dovetail guide-blocks bolted to the face thereof, a shaft journaled in said shank and having a cam of an odd number of sides within said pocket, with a slide carrying the cutting-tool and movable in said guide-blocks and having lugs engaging opposite sides of said cam, substantially as specified.

CHARLES A. THOMSON.

Witnesses:
JOSEPH RANDALL,
JAMES SCOTT.